D. A. MacARTHUR.
BELT OR STRAP.
APPLICATION FILED JULY 2, 1917.

1,392,256.

Patented Sept. 27, 1921.

UNITED STATES PATENT OFFICE.

DUNCAN ALFRED MacARTHUR, OF OTTAWA, ONTARIO, CANADA, ASSIGNOR TO THE GOODYEAR TIRE & RUBBER COMPANY OF CANADA LIMITED, OF TORONTO, ONTARIO, CANADA.

BELT OR STRAP.

1,392,256.  Specification of Letters Patent.  Patented Sept. 27, 1921.

Application filed July 2, 1917. Serial No. 178,312.

(GRANTED UNDER THE PROVISIONS OF THE ACT OF MARCH 3, 1921, 41 STAT. L., 1313.)

*To all whom it may concern:*

Be it known that I, DUNCAN ALFRED MACARTHUR, a subject of the King of Great Britain, and resident of 24 Patterson avenue, in the city of Ottawa, Province of Ontario, Dominion of Canada, have invented certain new and useful Improvements in Belts or Straps, of which the following is a specification.

This invention relates to improvements in belts or straps designed to be used in harness making, as for example in manufacturing traces, and generally capable of being used to fulfil those functions usually performed by traction or driving belts, and the objects of the invention are to impart to the belt a greater tensile strength together with lightness, to permit of the belt being twisted in conformity with the usual practice of teamsters in tying up the traces without such twisting interfering with the life of the belt or tending to deteriorate the same, to cheapen the cost of construction and generally to adapt the several parts of the belt or trace to better perform the functions required of them.

With the above and other objects in view, the invention consists essentially of the improved construction particularly described and set forth in the following specification and accompanying drawings forming part of the same.

In the drawings.

Like characters of reference refer to like parts in the several figures.

Figure 1:
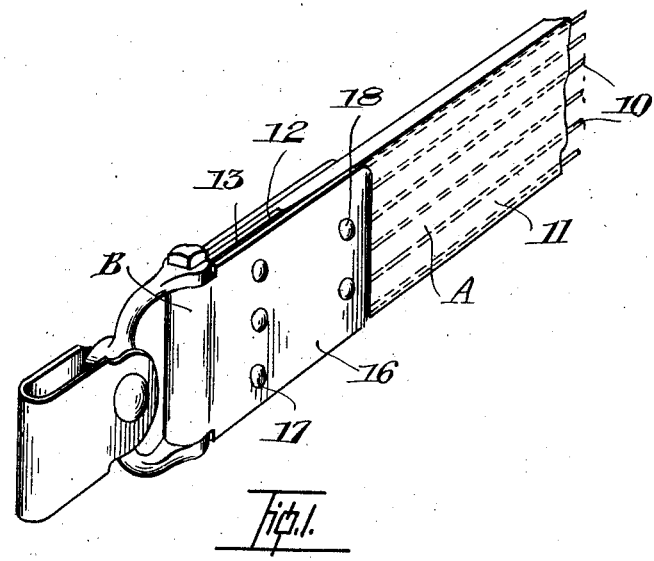
Figure 1 is a perspective view of a trace embodying the present invention.
Figure 2:
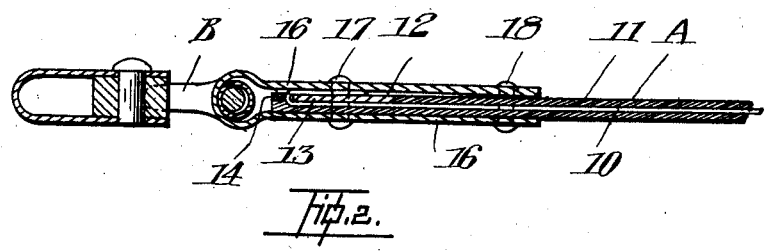
Fig. 2 is a longitudinal section of the same.
Figure 3:
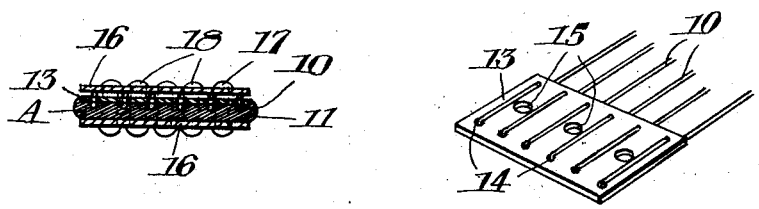
Fig. 3 is a transverse section through the end fitting of the trace.

Referring to the drawings, A represents a belt or strap consisting of a plurality of longitudinally extending and equidistantly spaced resilient wires 10, between which pieces of frictioned and rubber coated fabric are placed to fill the spaces, the whole being then wrapped or enveloped in a layer or layers 11 of frictioned and rubber coated fabric, which is subsequently vulcanized so producing a belt of great tensile strength.

In the embodiment illustrated, the belt is used as a trace and to this end the fabric 11 on one end of the belt is cut away to form a recess 12, so exposing the wires 10.

Figure 4:
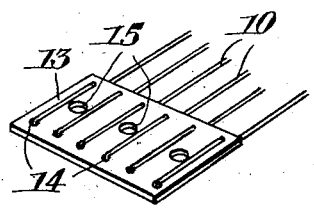
Fig. 4 is a perspective view of the plate to which the trace fitting is attached, showing the means of securing the wires in place.

A plate 13 is fitted into the recess 12 and the outer face of the plate is flush with the outer face of the belt, the plate being provided with a plurality of orifices 14, and 15, through the former of which the ends of the wires 10 are passed and then bent backwardly as shown in Fig. 4.

The plate 13 and the end of the belt is now embraced between the arms 16 of the trace fitting B and this trace fitting is secured in position by rivets 17, passing through orifices 15 in the plate 13. The ends of the arms 16 may be secured by rivets 18 passing therethrough and through the fabric of the belt A.

When the fitting B is thus positioned, the free ends of the wires 10 are tightly pressed against the plate 13, and frictionally retained in position so that when a pull is applied to the trace, it is directly transmitted to the wires 10 and there is no possibility of these wires loosening or slipping.

It will thus be seen that the fabric 11 is not subjected to any undue strain and while thoroughly protecting the wires 10 from rain or the like which might deteriorate or shorten the life of the wires, it also performs the functions of uniformly binding the wires together, so that the belts are capable of being applied to the uses for which belts are generally adapted.

While in the embodiment illustrated, I have applied the belt to a trace it will be readily seen that by dispensing with the fitting B and using a belt fastener, a driving belt may be readily constructed.

As many changes could be made in the above construction, and many apparently widely different embodiments of my invention within the scope of the claims, constructed without departing from the spirit or scope thereof, it is intended that all matter contained in the above specification and accompanying drawings be interpreted as illustrative, and not in a limiting sense.

What I claim as my invention is:

1. A belt comprising a plurality of equidistantly spaced wires, fabric covering the said wires and vulcanized thereto, part of the fabric being cut away to form a recess at the end of the belt and expose the wires, a plate having a plurality of holes, fitting the said recess, the free ends of the wires being passed through the holes and bent backwardly, and a fitting secured to the said plate.

2. A belt comprising a plurality of equidistantly spaced wires, frictioned and rubber-coated fabric filling the spaces between the wires, fabric inclosing or enveloping the wires and vulcanized thereto, part of the fabric being cut away to form a recess at the end of the belt and expose the wires, a plate in said recess having a plurality of holes through which the exposed ends of the wires are passed and bent backwardly, and means embracing the end of the belt adapted to frictionally press the ends of the wires against the plate.

In witness whereof I have hereunto set my hand in the presence of a witness.

DUNCAN ALFRED MacARTHUR.

Witness:

J. MITCHELL.